United States Patent [19]

Murri

[11] Patent Number: 4,917,333
[45] Date of Patent: Apr. 17, 1990

[54] ACTUATED FOREBODY STRAKES

[75] Inventor: Daniel G. Murri, Grafton, Va.

[73] Assignee: The United States of America as represented by the Administrator of the National Aeronautics and Space Administration, Washington, D.C.

[21] Appl. No.: 192,563

[22] Filed: May 11, 1988

[51] Int. Cl.$^4$ ............ B64C 9/02; B64C 9/08
[52] U.S. Cl. ............ 244/75 R; 244/45 A; 244/46; 244/90 R
[58] Field of Search ............ 244/45 R, 45 A, 46, 244/87, 88, 89, 199, 90 R, 3.26–3.29; D12/331–332

[56] References Cited

U.S. PATENT DOCUMENTS

| | | | |
|---|---|---|---|
| 1,250,033 | 12/1917 | Scroggs | 244/35 R |
| 2,386,915 | 10/1945 | Spitter | 244/88 |
| 2,743,888 | 5/1956 | Lippisch | 244/199 |
| 2,924,400 | 2/1960 | Ruget | 244/45 A |
| 2,941,752 | 6/1960 | Gluhareff | 244/46 |
| 3,170,657 | 2/1965 | Riebe et al. | 244/46 |
| 3,884,435 | 5/1975 | Croy et al. | 244/46 |
| 4,010,920 | 3/1977 | Farner | 244/89 |
| 4,378,922 | 4/1983 | Pierce | 244/45 A |
| 4,786,009 | 11/1988 | Rao et al. | 244/45 A |

OTHER PUBLICATIONS

Neilhouse, A. I. et al., "Status of Spin Research for Recent Airplane Designs" NASA TR R-57, 1960.

Chambers, J. R.; Anglin, E. L.; and Bowman, J. S., Jr.: Effects of a Pointed Nose on Spin Characteristics of a Fighter Airplane Model Including Correlation with Theoretical Calculations, NASA TN D-5921, Sep. 1970.

Rao, D. M.; Moskovitz, C.; and Murri, D. G.: Forebody Vortex Management for Yaw Control at High Angles of Attack, ICAS-86-2.5.2, Sep. 1986.

Primary Examiner—Galen Barefoot
Attorney, Agent, or Firm—George F. Helfrich; John R. Manning; Charles E. B. Glenn

[57] ABSTRACT

Actuated forebody strakes provide yaw control at high angles of attack. In one embodiment, the strakes are axially slidable in the forebody to be deployed out of slots provided for the strakes in the forebody. In another embodiment, the strakes are pivotally connected at the tip of the strakes to pivot radially outwardly out of the slots provided in the forebody. In another embodiment, the forebody is provided with either a single strake or two strakes and the forebody is rotatable to vary the radial location of the strake or strakes. All embodiments achieve significant yaw control capability over a wide angle of attack and sideslip ranges.

10 Claims, 5 Drawing Sheets

Normally
deployed

Normally
retracted

Undeflected
strakes

Deflected
strakes

FIG. 3A
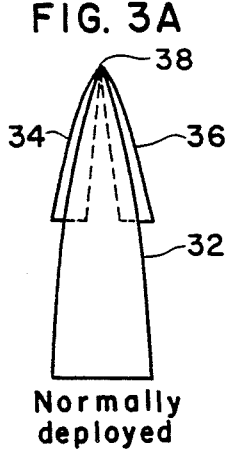
Normally deployed
FIG. 3B
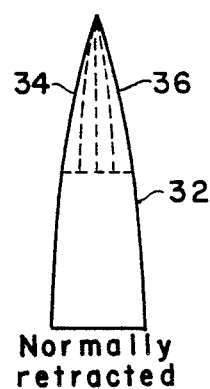
Normally retracted
Undeflected strakes
FIG. 3C
FIG. 3D
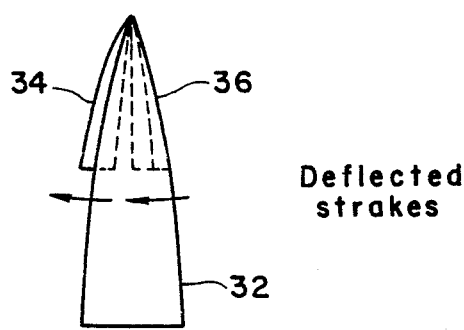
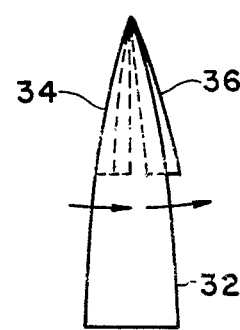
Deflected strakes
FIG. 6A
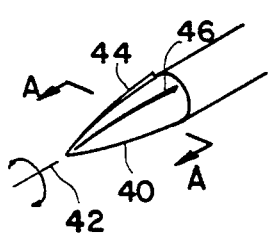
FIG. 6B
FIG. 6C
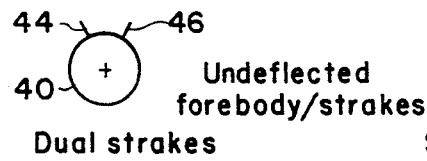 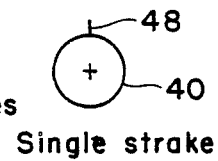
Undeflected forebody/strakes
Dual strakes — Single strake
FIG. 6D
FIG. 6E
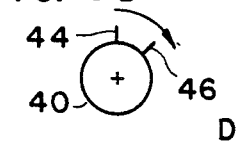 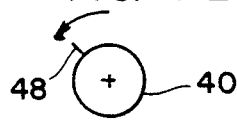
Deflected forebody strakes
FIG. 6F
FIG. 6G
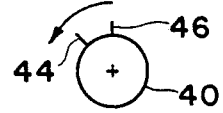 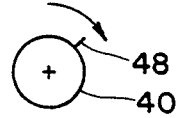

ACTUATED FOREBODY STRAKES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to aircraft flight controls, and more specifically, to actuated forebody strakes for yaw control at high angles of attack.

2. Description of the Related Art

Fighter aircraft engaged in aerial combat are required to make aggressive maneuvers, particularly during one-on-one combat with other fighter aircraft. These aggressive maneuvers frequently require deceleration to low speeds and high angles of attack (a).

A major factor which limits the high angle of attack effectiveness of current fighter aircraft is the degradation of rudder yaw control as angle of attack is increased. The level of yaw control provided by a conventional rudder decreases as the angle of attack is increased because the vertical tail becomes immersed in the low-energy stalled wake generated by the wing. This presents a problem since the level of yaw control required increases due to the higher yaw rates required to coordinate rolling maneuvers at the higher angles of attack. For current models of fighter aircraft, the result is that the amount of yaw control required exceeds the amount available beginning at an angle of attack substantially less than the angle of attack for maximum lift. As a result, the roll-rate of the aircraft is limited and thus leads to reduced maneuverability.

When high angles of attack are experienced, the forebody itself remains in undisturbed flow and creates a pair of powerful vortices.

The forebody portion of an aircraft has become an increasingly important aerodynamic factor in aircraft design. In most modern fighter aircraft, the moment arm from the forward-most point of the forebody to the center of gravity is equal to or greater than the moment arm of the vertical tail or tails. Therefore, the forebody is well suited for placement of control surfaces which can take advantage of the powerful vortex flow field and long moment arm associated with the forebody.

In one previous attempt to control the vortex generated by the forebody at high angles of attack, jet blowing over the forebody is used to influence the direction of the naturally occurring vortex asymmetry in order to effect yaw control. However, because of the non-linear characteristics of the natural vortex asymmetry, jet blowing has not been effective for controlling the level of yawing moment produced. Moreover, jet blowing, when effective, is limited to small sideslip angles due to the strong effect of sideslip on the vortex asymmetry.

An asymmetric nose strake attached to the long, slender forebodies of aircraft has been investigated as a means for generating yawing moments at high angles of attack. Neilhause, A.I. et al., "Status of Spend Research for Recent Airplane Designs" (NASA TR R-57, 1960); Chambers, J.R., et al., "Effects of a Pointed Nose on Spend Characteristics of a Fighter Airplane Model Including Correlation with Theoretical Calculations" (NASA TN D-5921, September 1970). In these prior investigations, an "asymmetric" strake is a fixed surface attached to the forebody at a radial location other than in the vertical symmetry plane. It was discovered from these prior investigations that a single strake attached to one side of an aircraft forebody is capable of producing consistently large yawing moments. However, the asymmetric nose strake was considered for generating large yawing moments to be used for spin recovery, and the possibility of modulating the level of yaw control for use as an active control device was not considered.

Aircraft forebodies which exhibit a substantial natural vortex asymmetry at high angles of attack would require a symmetric nose strake deployment to reduce the vortex asymmetry when no yawing moment is required. One such symmetric nose strake deployment is accomplished with a longitudinally hinged strake concept which forces symmetric flow separation when the strakes are deployed in a symmetric position. In the case of longitudinally hinged strakes, opposite-side strakes are deflected differentially to generate a vortex asymmetry to provide the desired yaw control. For longitudinally hinged strakes, a "conformal" strake is used when the strakes are required to be retracted at low angles of attack. In a conformal strake, the strake pivots longitudinally and conforms to the side of the forebody. Forebodies that do not produce a substantial natural vortex asymmetry would not require an initial symmetric strake deployment. In this case, a pair of conformal strakes are implemented such that either strake could be deployed depending on the direction of yaw control required.

The longitudinally hinged forebody strake has been shown to provide enhanced levels of yaw control at high angles of attack. However, the concept is limited by the fact that modern fighter aircraft normally have forebodies which exhibit complex curvatures and cross-sectional characteristics that vary along the length of the forebody. Thus, the design and fabrication of longitudinally hinged conformal forebody strakes would be technically difficult and expensive. Also, the radial location of the hinged strakes determines the angle of attack and sideslip ranges of effectiveness. Since the hinged strake concept provides for strakes that would be fixed at a predetermined radial location, the angle of attack and sideslip ranges of effectiveness would be inherently limited. Another problem is that for military aircraft having radar mounted in the forebody section, performance of the radar can be adversely affected by moving metallic parts placed ahead of the radar unit. Therefore, the longitudinally hinged forebody strake, which has moving metallic parts, including at least hinges and linkages, could reduce radar performance

SUMMARY OF THE INVENTION

An object of the invention is to provide a control surface that uses the forebody vortex flow field to produce a controllable source of yaw power over a wide angle of attack and sideslip range.

Another object of the invention is to provide a control surface which can be actuated or deflected to generate a controlled vortex asymmetry, thereby providing the direction and level of yawing moment required.

These objects, together with other objects and advantages which will be subsequently apparent reside in the details of construction and operation of the apparatus as more fully hereinafter described and claimed, reference being had to the accompanying drawings forming a part hereof, wherein like reference numerals refer to like parts throughout.

BRIEF DESCRIPTION OF THE DRAWINGS

FIGS. 3A-3D are schematic illustrations of forebody strake dispositions of a second preferred embodiment of the present invention;

FIG. 6A is a perspective, schematic view of a third, preferred embodiment of the present invention;

FIGS. 6B-6G are schematic, cross-sectional views of the embodiment of FIG. 6A in various states of deployment.

DETAILED DESCRIPTION OF THE PREFERRED EMBODIMENTS

Figure 1:
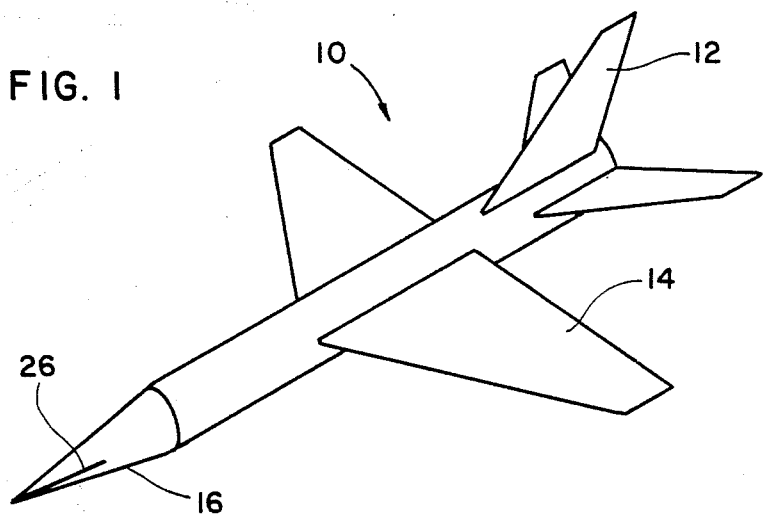
FIG. 1 is a perspective, schematic view of an aircraft having a forebody according to a preferred embodiment of the present invention.

In FIG. 1, an aircraft 10 has a vertical tail 12, wings 14, and a forebody 16. The aircraft 10 is representative of fighter aircraft having trapezoidal wing configurations. The principles of the invention apply to aircraft having other tails and wings, and complex forebody configurations. The forebody 16 is conically shaped for illustration. Also, wind tunnel testing of model aircraft was performed using conically shaped forebodies.

Figure 2A:
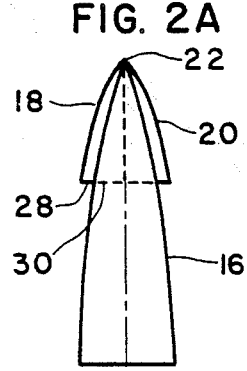
FIGS. 2A-2D are schematic illustrations of forebody strake dispositions according to a first preferred embodiment of the present invention.
Figure 2B:
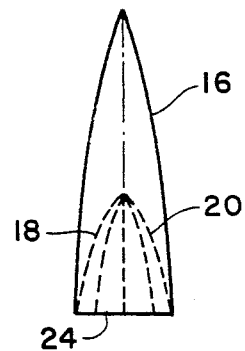

The embodiment of FIGS. 2A-2D includes two opposite-side strakes 18 and 20 which are slidable in a longitudinal direction to a symmetric, normally extended disposition as shown in FIG. 2A. In the FIG. 2A disposition, the strakes 18 and 20 extend to the apex 22 of the forebody 16. In the normally retracted position of FIG. 2B, both strakes 18 and 20 are retracted into the forebody 16 by sliding longitudinally along tracks or other suitable means provided in the forebody. In the fully extended, normally deployed disposition of FIG. 2A, each strake slides out of a slot 26 provided in the forebody 16. In the normally retracted disposition of FIG. 2B, both strakes 18 and 20 retract backwardly towards base 24 of the forebody 16. The sliding strake provides a varying degree of projection (width) of the strakes without varying the degree of deflection. Whether or not the strakes are normally retracted or extended depends on the configuration of the forebody of the aircraft. As previously discussed above, some forebodies exhibit substantial natural vortex asymmetry at high angles of attack. These would require the extended disposition of FIG. 2A.

Figure 2C:
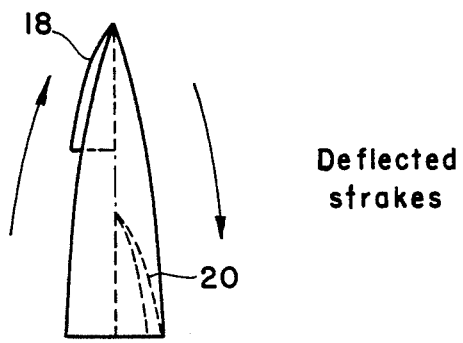
Figure 2D:
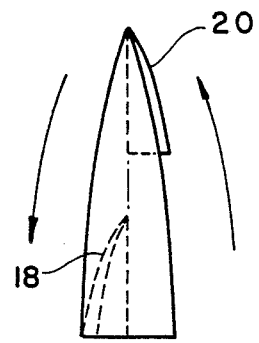
Figure 4:
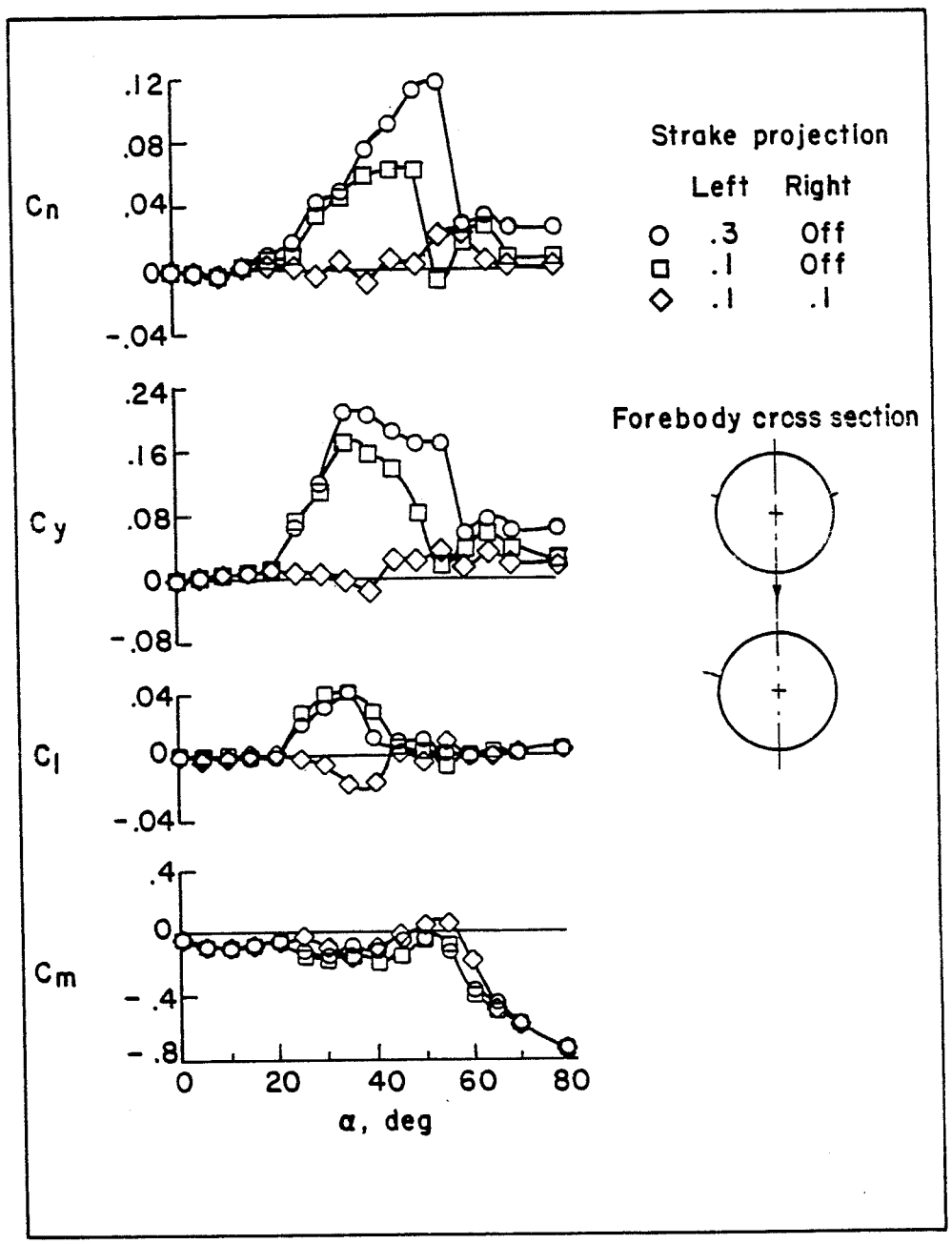
FIG. 4 is a chart showing the effectiveness of left-side strake projections according to the embodiments of FIGS. 2A-2D and 3A-3D.
Figure 5:
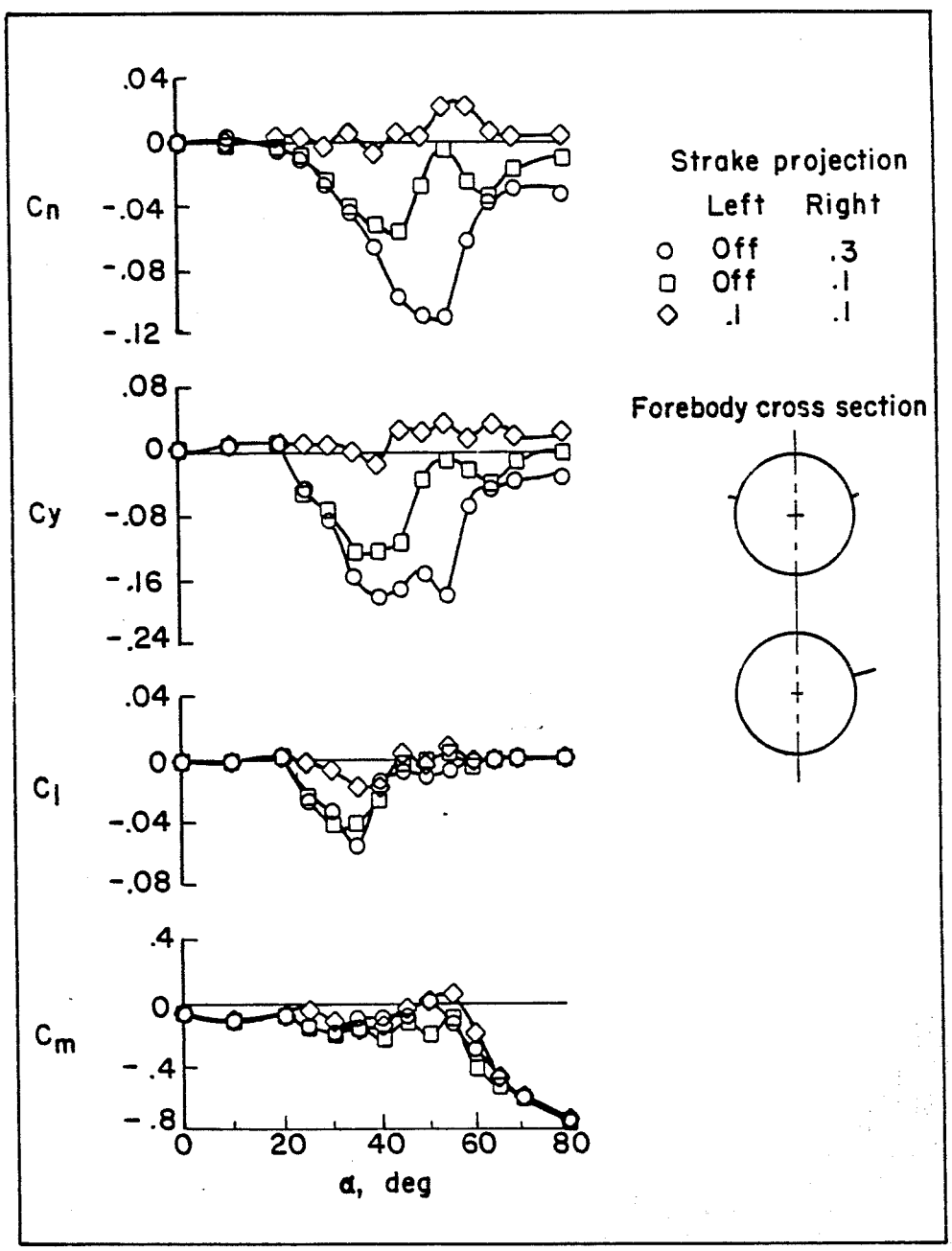
FIG. 5 is a chart illustrating the effectiveness of right-side strake projections for the embodiments of FIGS. 2A-2D and 3A-3D.

FIGS. 2C and 2D illustrate yaw control dispositions in which the strakes 18 and 20 slide differentially to effect yaw control. In this embodiment and in other embodiments to be described later, tests were conducted with a ratio of strake root cord 28 ($C_R$) to forebody base radius 30 ($R_B$) from 0 to about 0.3. Wind tunnel tests were performed on a model employing the strakes described herein and a basic 26° trapezoidal wing configuration. The strake cicumferential or radial position in degrees (positive on left) was about ±105°. The strake configuration that produced the maximum yaw control resulted with a full-width strake on one side and no strake on the opposite side. These results are illustrated in FIGS. 4 and 5 in which $C_n$=body-axis yawing-moment coefficient; $C_Y$=side-force coefficient; $C_l$=body-axis rolling-moment coefficient; and $C_m$=body-axis pitching-moment coefficient.

FIGS. 4 and 5 show that this strake concept provides high levels of yaw control over wide angles of attack. The level of yaw control is modulated by varying the strake projection width instead of the strake deflection angle, as is done for longitudinally hinged strakes. From a symmetric, narrow-strake baseline ($C_R/R_B=0.1$), retracting one strake and then extending the opposite strake can effectively vary the yawing moment. The sliding strake concept, therefore, provides an effective way of modulating yawing moments where conformal, longitudinally hinged strakes are impractical.

Figure 7:
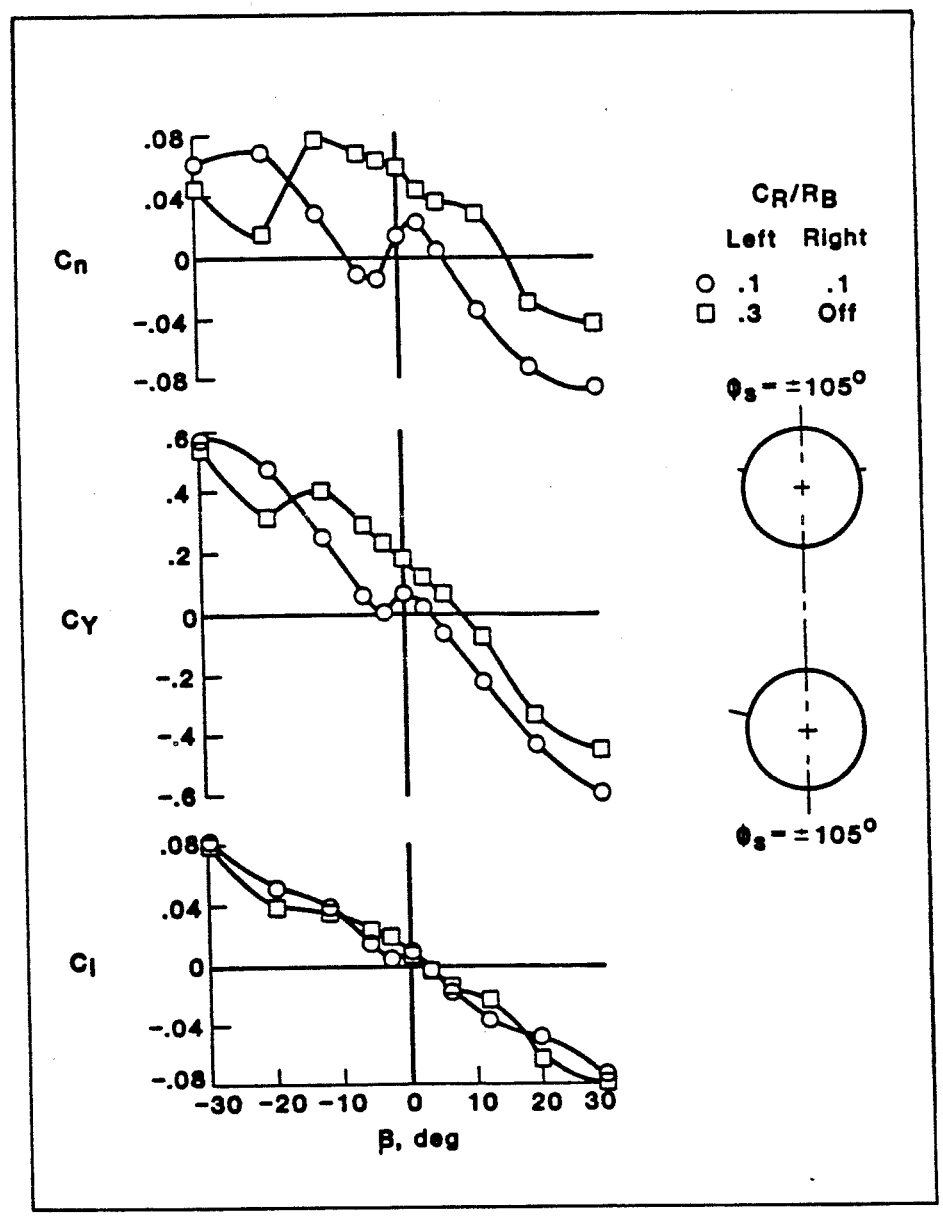
FIG. 7 is a chart showing the effectiveness of left-side strake projections according to the embodiments of FIGS. 2A-2D and 3A-3D.

FIG. 7 shows that this strake concept provides high levels of yaw control over wide sideslip ranges, where $\beta$ (on the X axis) is the angle of sideslip.

A second, preferred embodiment of the invention is illustrated in FIGS. 3A-3D, in which a forebody 32 is provided with opposite-side strakes 34 and 36. The strakes 34 and 36 are pivotally connected at apex 38 of forebody 32 and at the tips of the strakes so as to pivot radially outwardly. While the drawings show connection at the apex of the forebody 32, the strakes may be connected further aft and still maintain a high degree of effectiveness. The retracted position is illustrated in FIG. 3B, and the extended position is illustrated in FIG. 3A. In the extended position, the strakes pass through slots provided in the sides of the forebody 32. Differential projection of the strakes 34 and 36 to effect yaw control in opposite directions is illustrated in FIGS. 3C and 3D. In FIG. 3C, strake 34 is deployed, while strake 36 remains retracted. Similarly, in FIG. 3D strake 34 remains retracted, while strake 36 is deployed. The width of the deployed strake in FIGS. 3C and 3D, or the width of the two strakes 34 and 36 deployed in FIG. 3A, can be varied in accordance with the required degree of modulation. The results of deployment for the embodiment of FIGS. 3A-3D are illustrated in FIGS. 4 and 5 and represent the same results obtainable by using the embodiment of FIGS. 2A-2D. The data shown in FIGS. 4 and 5 indicate that strake projections can generate large values of yawing moment ($C_n$) and side force ($C_y$) at angles of attack between 20° and 60°. Smaller values of coupled rolling moment ($C_l$) were also produced on this configuration because of an induced aerodynamic effect on the highly-swept wing leading-edge extension that was used in wind tunnel testing of the model. Overall, the embodiments of FIGS. 2A-2D and 3A-3D provide high levels of controlled yaw power over wide ranges of angle of attack and sideslip. Either the sliding or pivotal strake concept would be easy to implement since they both require only slots in the forebody. In other words, there is no need to develop complex, three-dimensional conformal shapes which would be necessary for longitudinally hinged strakes.

In the longitudinally hinged strake, the ability to modulate the level of yaw control is made possible by varying the strake deflection angle. Radial location of the strakes also played an important part in determining the amount of yaw control. However, in the previously discussed longitudinally hinged strakes, radial location is fixed, but the deflection angle is variable.

The embodiment illustrated in FIGS. 6A-6G provides an alternative in which the radial location of the strakes is varied by providing a forebody 40 that is rotatable about its longitudinal axis 42. The undeflected strakes 44 and 46 are provided symmetrically about a vertical symmetry plane through the forebody 40. In this embodiment, a single strake 48 (FIG. 6C) or a pair of strakes 44 and 46 (FIG. 6B) are fixedly attached to the forebody or a portion thereof that is rolled or rotated about its longitudinal axis. To effect yaw control, the forebody is rolled to move the strakes from a symmetric position to a non-symmetric position skewed to one side or the other, depending on the direction of yawing moment required.

As in the previous embodiments, the yawing moment is generated by modulating the powerful forebody vortex flow field. FIGS. 6D and 6F illustrate the deflected strakes which are deflected by rotating the forebody 40. FIGS. 6E and 6G illustrate similar deflected dispositions for the single strake 48 which is symmetrically undeflected in a vertical position.

The embodiment of FIGS. 6A-6G provides substantially the same results which were illustrated in FIGS. 4 and 5 for the other embodiments. Another significant advantage achieved by the rotatable forebody is that since the radial location of the strakes on the forebody determines the angle of attack and sideslip ranges of effectiveness, these ranges can be expanded due to the variable nature of the radial location of the strakes. In the longitudinally hinged strake, the strakes are fixed at a predetermined radial location. Therefore, the angle of attack and sideslip ranges of effectiveness would be inherently limited. In the embodiment of FIGS. 6A-6G, the radial location of the strake or strakes could be adjusted to the optimum position for a given angle of attack and sideslip. Therefore, this embodiment provides a much wider range for angle of attack and sideslip than that which is available through the use of longitudinally hinged strakes.

Another improvement associated with the embodiments of FIGS. 6A-6G is related to radar performance. The longitudinally hinged strake is likely to reduce radar performance because of the requirement for moving metallic parts located forward of the radar. By using a rotatable forebody, the entire forebody/strake portion can be made of non-conductive material, while metal parts including bearings which would be necessary to rotate the forebody could be located behind the radar where they would have no impact on performance. Any conventional mechanical means can be employed for rotatably mounting the forebody to a forward portion of the fuselage of the aircraft. In the embodiment of FIGS. 3A-3D, any conventional mechanical means can be employed for pivotally connecting the strakes to the forebody for pivotal movement in and out of slots provided in the sides of the forebody. For longitudinally sliding the strakes of FIGS. 2A-2D, any conventional mechanical means may be employed for moving the strakes longitudinally in and out of slots provided in the sides of the forebody.

The radial location and strake deflection angle are important factors in determining yawing moments. Generally, a single nose strake is capable of producing consistent yawing moments with strake locations in the radial location range of 40°-60° measured from the bottom of the forebody. In this range, consistent yawing moments in the direction of the projected strake are generated from about 20°-60° angle of attack. Consistent yawing moments are also generated over wide angle of attack ranges for strake radial locations of 90-120°; however, the direction of yawing moment is reversed compared to the lower values in the 40°-60° range.

With the strake at a radial location of 60°, the strake forces flow separation and produces a vortex located close to the forebody surface. The strake vortex is then followed by a reattachment of the flow and a weakening of the vortex on the strake-off side. With a strake on the lefthand side of the forebody, the total effect is manifested as a clockwise circulation of the forebody cross-flow (looking forward) and a deflection of the wake to the strake-off side. The result is a slight increase in suction pressure on the strake side of the forebody, a decrease in suction pressure on the strake-off side, and a net yawing moment in the strake (negative) direction.

Fundamentally different behavior is exhibited by the strake in the 90° position. In this case, the strake is acting as a spoiler by pushing the strake vortex away from the forebody and preventing reattachment of the separated flow. With a strake on the lefthand side of the forebody, an effective counter-clockwise circulation (looking forward) is produced which deflects the wake toward the strake side of the forebody. Therefore, the addition of the strake in the 90° position causes a net yawing moment in the strake-off (positive) direction.

For longitudinally hinged strakes, the radial location would first be selected, and then the angular deflection would be varied to modulate yaw control. In the present invention, the radial location is selected and then the radial width of the strakes is varied to modulate yaw control. The test model which obtained the results illustrated in FIGS. 4 and 5, was based on a strake circumferential position of ±105° for a modified 26° trapezoidal-wing configuration. Due to the fact that the strake deflection angle is fixed at 0°, modulation is achieved by width variation. To say that the strake deflection angle is at 0° means that the strake extends perpendicularly to a tangent at the point of radial location of the strake.

Since yawing moment is variable according to the radial location, the rotating forebody provides modulating yawing moment which results from changing the radial location of the strake or strakes on the forebody. The radial location of the strake or strakes has a strong influence on the level and direction of yawing moment and the yawing moment modulation capability.

The data presented in FIGS. 4 and 5 indicate that from a symmetric narrow-strake case where $C_R/R_B=0.1$, retracting one strake and then extending the opposite strake provides an effective means for varying the yawing moment. Varying the width of the strake can be accomplished by either of the embodiments of FIGS. 2A-2D and 3A-3D, i.e., by pivoting outwardly or sliding longitudinally.

The many features and advantages of the present invention are apparent from the detailed specification, and thus, it is intended by the appended claims to cover all such features and advantages of the actuated forebody strakes which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and the spirit of the invention.

What is claimed is:

1. An apparatus for controlling yawing moment of an aircraft having a forebody, the apparatus comprising:
    a first strake mounted for movement in and out of the forebody;
    a second strake mounted for movement in and out of the forebody;
    the first and second strakes being symmetrically disposed and movable between alternative positions including a position where both strakes are simultaneously fully projectable radially outwardly from the forebody, a position where both strakes are simultaneously fully retractable inside the forebody, and a plurality of positions where the strakes are differentially projectable where one strake is projectable outwardly to varying widths and the other is fully retractable;
    the first and second strakes being slidably connected to the forebody for sliding axially in a nd out of the forebody in a fore and aft direction.

2. An apparatus for controlling yawing moment of an aircraft having a forebody, the apparatus comprising:
    a first strake being slidably supported in the forebody for axial movement in a fore and aft direction; and
    a second strake being slidably supported in the forebody for axial movement in a fore and aft direction;
    the first and second strakes being symmetrically disposed and movable between alternative positions including a position where both strakes are simultaneously fully projectable radially outwardly from the forebody, a position where both strakes are simultaneously fully retractable inside the forebody, and a plurality of positions where the strakes are differentially projectable where one strake is projectable outwardly to varying widths and the other is fully retractable.

3. An apparatus for controlling yawing moment according to claim 2, wherein the forebody includes opposite-side slots, and the first and second strakes are slidable outwardly from the opposite-side slots.

4. An apparatus for controlling yawing moment according to claim 3, wherein the forebody has an apex, and wherein the strakes have tips substantially coterminous with the forebody apex when the first and second strakes are in the fully projected position.

5. An apparatus for controlling yawing moment according to claim 3, wherein each strake has a tip and a base and a strake root cord defined as the width of the strake at the base measured from an outer edge of the strake to an outer edge of the forebody at the base of the strake, and wherein the ratio of the strake root cord to the forebody radius at the base of the strake is variable between zero and about 0.3.

6. An apparatus for controlling yawing moment according to claim 2, wherein the radial locations of the first and second strakes on the forebody are ±105°.

7. An apparatus for controlling yawing moment of an aircraft, comprising:
    a forebody rotatably connected to a forward portion of the aircraft;
    at least one strake connected to the forebody and extending radially outwardly therefrom, and having a normal symmetric radial location which is variable to effect yaw control by rotating the forward portion of the forebody.

8. An apparatus for controlling yawing moment according to claim 7, wherein the at least one strake comprises a single strake having a normal radial location of 90°.

9. An apparatus for controlling yawing moment according to claim 7, wherein the at least one strake comprises first and second strakes symmetrically disposed about a symmetry plane of the forebody.

10. An apparatus for controlling yawing moment according to claim 7, wherein the forebody is made of a non-conductive material.

* * * * *